United States Patent

Nykanen et al.

[11] Patent Number: 5,835,862
[45] Date of Patent: Nov. 10, 1998

[54] DATA ADAPTER UNIT FOR INFRARED COMMUNICATIONS

[75] Inventors: Petri Tapio Nykanen, Irving, Tex.; Marko Erkkila, Siuro, Finland; Jyri Rauhala, Tampere, Finland; Juha Rinne, Tampere, Finland; Matti Uusimaki, Tampere, Finland; Mikko Terho, Tampere, Finland; Hannu Tiilikainen, Helsinki, Finland

[73] Assignee: Nokia Mobile Phones Ltd., Salo, Finland

[21] Appl. No.: 611,349

[22] Filed: Mar. 6, 1996

[51] Int. Cl.[6] .............................. H04Q 7/32; H04M 1/00
[52] U.S. Cl. .................... 455/558; 455/556; 455/557; 455/558; 379/56.3
[58] Field of Search ...................... 455/557, 556, 455/558, 90, 56.3, 56.1; 349/56.1, 56.3

[56] References Cited

U.S. PATENT DOCUMENTS

| | | | |
|---|---|---|---|
| 4,221,932 | 9/1980 | Anglikowski et al. | 379/56.3 |
| 5,353,328 | 10/1994 | Jokimies | 455/90 |
| 5,418,837 | 5/1995 | Johansson et al. | 455/558 |
| 5,446,783 | 8/1995 | May | 379/56.3 |
| 5,487,099 | 1/1996 | Maekawa | 455/556 |
| 5,519,763 | 5/1996 | Namekawa et al. | 455/556 |
| 5,566,226 | 10/1996 | Mizoguchi | 455/558 |
| 5,570,389 | 10/1996 | Rossi | 455/557 |
| 5,572,573 | 11/1996 | Sylvan et al. | 455/556 |
| 5,581,594 | 12/1996 | McAfee | 379/56.1 |
| 5,617,449 | 4/1997 | Tanaka | 455/558 |

Primary Examiner—William Cumming
Assistant Examiner—Jean A. Gelin
Attorney, Agent, or Firm—Perman & Green, LLP

[57] ABSTRACT

A data adapter unit, for converting data signals for IR wireless transmission between electronic devices, containing an IR-electrical converter, and IR and electrical input/output ports, and accommodating a removably connectable device, such as a cellular phone, and a removably connectable data converter such as a PC or cellular data card. The phone, when mounted in the adapter unit, exchanges voice and data signals through an internal interface with the removable PC card which converts the data signals for exchange through either the IR or electrical input/output signal ports. The signal ports communicate the data signals to an external device such as a personal computer or a modem and return signals therefrom. When the electrical port is connected to an outside device, the normal IR transmission is ceased in favor of the electrical output, or this function may be achieved by a user operated switch. The removable data converter may also have a signal coding component to encode the signals into a form that renders the transmission and reception of wireless IR signals more reliable. In that event, the data adapter unit itself may be kept simple, rather than incorporating such additional components. An internal power source may be included in the unit to power the signal exchange activities.

21 Claims, 1 Drawing Sheet

DATA ADAPTER UNIT FOR INFRARED COMMUNICATIONS

BACKGROUND OF THE INVENTION

1. Field of the Invention

The present invention relates to electronic transmissions involving infrared (IR) communication links, and, more particularly, to a data adapter unit that converts data transmitted over IR communication links between electronic devices to a suitable form for processing within the devices.

2. Prior Art

It has become well known to send data wirelessly between electronic processing devices, such as a computer and a mobile phone, using a PC card as a data adapter means for converting the data to suitable forms for processing in each of the devices. The PC card is of growing importance because of the increasing popularity of small, generally hand-held, mobile computers for which it is an accessory. In fact, The Personal Computer Memory Card International Association (PCMCIA) has been formed to promote PC card standards to foster compatibility with various computer devices with respect to memory, mass storage, and input/output.

In the noted computer-mobile phone application, for example, the PC card is a data adapter which can be installed in either unit for converting data from the mobile phone into a suitable form for the computer and likewise converting data coming from the computer into a suitable form for the mobile phone. An example of a prior art system for transmitting electronic information between a cellular phone and an electronic device such as a computer is disclosed in U.S. Pat. No. 5,446,783, issued to G. J. May and assigned to Hewlett-Packard Company, wherein an IR converter is provided in a battery pack which attaches to the cellular phone. It will be seen that the data adapter is disposed in the phone and the IR converter must be attached directly to the phone for proper operation. This complicates the phone unnecessarily if the data adapter is built in, since a user may only wish to use the phone for speech services and not wireless data services as well, and it renders the phone more expensive.

PROBLEM TO BE SOLVED

It is therefore a problem in the art to achieve an adaptable data converter that is desirable for use with computers, cellular phones, and like electronic devices, is simple to use and relatively inexpensive.

OBJECTS

It is accordingly an object of the present invention to provide an improved data adapter unit which provides versatility and adaptability in conducting communications between electronic devices.

It is another object of the invention to provide such an improved unit for facilitating wireless IR communication between different electronic devices.

It is also an object of the invention to provide a data adapter unit that is simple to use and of simple and inexpensive construction.

SUMMARY OF THE INVENTION

The present invention involves a versatile data adapter unit in the form of a data card expander which contains an IR-electrical converter, and IR and electrical input/output ports, while accommodating a removably connectable telephone and a removably connectable data converter such as a PC or cellular data card. The phone, when mounted in the adapter unit, exchanges voice and data signals through an internal interface with the removable PC card which converts the signals for exchange through either the IR or electrical input/output signal ports. The signal ports communicate the signals to an external device such as a personal computer or a modem and return signals therefrom. A detector is provided in the unit that indicates whether the electrical port is connected to an outside device, in which case the normal IR transmission is ceased in favor of the electrical output. A user operated switch may also be used for this purpose. The removable data converter or card may be provided with a signal coding component to encode the signals into a form that renders the transmission and reception of wireless IR signals more reliable, preferably as reliable as optical cable transmission. In that event, the data adapter unit itself may be kept simple, rather than incorporating such additional components, although it offers that capability as an alternative. An internal power source such as a battery may be included in the unit to power the signal exchange activities and avoid a drain on the computer battery or other associated devices containing internal power supplies.

BRIEF DESCRIPTION OF THE DRAWING

The present invention will be described in more detail below with reference to the accompanying drawings in which.

DETAILED DESCRIPTION OF THE PREFERRED EMBODIMENT

Figure 1:
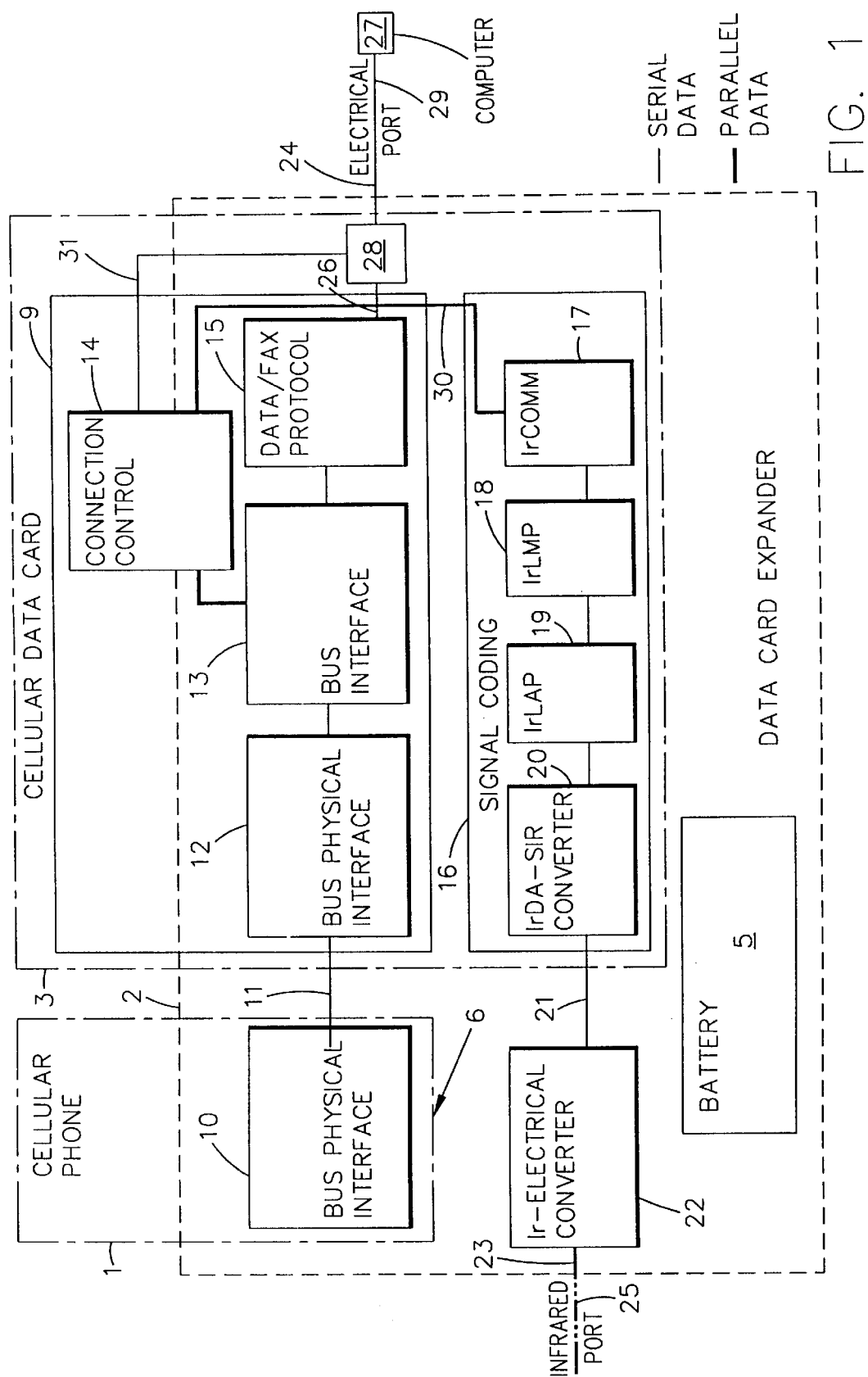
FIG. 1 is a schematic diagram of a data card expander in accordance with the present invention illustrating its combination with a removable cellular phone and cellular data adapter card, and an external computer.

The present invention is directed to a method and means for providing versatility and adaptability in conducting data communications between electronic devices, and particularly for facilitating wireless communication between different electronic devices, such as IR data transmissions between a cellular phone and a computer. Accordingly, a data adapter unit is presented in the form of a data card expander which contains an IR-electrical converter and IR and electrical input/output ports, and which accommodates a removable phone and a removable data converter such as a cellular or PC card. It may also be provided with an internal power source such as a battery. In particular, as seen in FIG. 1, a preferred embodiment of data adapter unit involves a data card expander device 2. The device 2 contains a battery 5 as a power supply and an IR-electrical converter 22 as well as IR and electrical input/output ports 25 and 24. It also has two receptacle means 6 and 7, respectively adapted to removably accept and mount an electronic device, such as a cellular phone 1, and a data converter unit, such as a cellular data card 3. The receptacle or mounting means 6 and 7 have an electrical connection 11 between them in the device 2 for communicating electrical signals between a bus interface 10 in cellular phone 1 and a bus interface 12 in cellular data card 3 when these units are mounted in and connected to the data card expander 2. Another electrical connection 21 in expander 2 communicates signals between receptacle means 7 and the IR-electrical converter 22, which in turn exchanges IR signals 23 through IR input/output port 25. There is also an electrical connection 26 between receptacle means 7 and electrical input/output port 24 for conducting electrical signals to and from the mounted cellular data card 3.

Cellular data card 3 may contain a data converter circuit block 9 which includes a number of functional blocks 12–15. Block 12 is the bus physical interface, block 13 is a bus interface, block 14 is a connection control, and block 15 is a data/fax protocol converter. A signal from the phone 1 on transmission line 11 is input to the data converter block 9 which converts the data input from the phone 1 into a suitable form for processing in an external computer 27 or modem or like device. Conversely, block 9 also converts data signals input from the computer 27 to the phone 1. Computer 27 may communicate with the expander unit 2 by being directly connected through a cable 29 to the electrical input/output port 24 or by means of an IR signal to and from the IR input/output port 25 as will be described.

Converter block 9, which may comprise the components of a conventional PCMCIA card, can also be fixedly disposed in the data adapter unit or expander 2, rather than in data card 3 as shown, or alternatively may be disposed in the mobile phone 1. However, the latter positioning would have the drawbacks of unnecessarily complicating the phone for someone using it only for speech and not wireless data service, and of making it more expensive. On the other hand, if the data converter 9 is fixed in the expander 2, then the data adapter unit can only be used as such.

Thus, in accordance with the present invention, it is preferred that converter block 9 be a data card 3 alone, or be part of a data card with additional functions; but, in either event, it is constructed in a card unit that may be releasably inserted in or attached to the data card expander 2. This unit card construction will also permit the converter 9 or the data card 3, to be used in a conventional way by connecting it directly to the computer 27, into a data card slot therein, and by a cable directly to the phone 1, if desired, as well as in the data card expander unit 2 by inserting it in receptacle 7 as shown in FIG. 1. In the latter case, the data adapter unit 2 can be implemented simply since any necessary data converting functions may be added by connecting to it a conventional data card which a user might already have.

Additionally, to facilitate wireless IR communications, the data card expander 2, or preferably the data card 3, is provided with signal coding means 16 which is connected to the block 9 by a line 30 from connection control block 14. Coding means 16 is also connected by line 21 to the IR-electrical converter 22 and encodes the exchanged signals into such a form that transmission and reception of the infrared signals becomes more reliable, preferably as reliable as by optical cable. This kind of coding means is necessary if a reliable IR transmission is desired. The signal coding means 16 may include different functioning blocks performing conversions according to different standards of the Infrared Data Association (IrDA). Thus, the functions of the blocks, i.e., block 17 (IrCOMM), block 18 (IrLMP, Infrared Link Management Protocol), block 19 (IrLAP, Infrared Link Access Protocol), and block 20 (IrDASIR, Serial InfraRed), are to add error correction capabilities for correcting possible errors occurring during IR transmission, and to convert the signal into a form in which it does not disturb other electronic devices. This adds reliability to the transmissions.

Signal coding means 16, in accordance with the invention, may be implemented by disposition in the data card expander 2, or preferably as part of the data card 3 so that the data adapter unit 2 can be kept simple and still increase the reliability of the transmissions. Also, in the latter arrangement, a user can choose between two kinds of data cards 3 according to his needs, i.e., either with or without the signal coding means 16.

The data adapter unit 2 according to the present invention has both a wireless IR port 25 and a direct connection electrical port 24 to deal with the drawback in wireless IR communication wherein the transmitter and receiver have to "see" each other during transmission, otherwise the IR transmission will fail. If, for example, a user is sitting in a location in which it is difficult to place the expander unit 2 and the computer 27 in such manner that the IR transmitter and receiver can achieve "eye contact", then the user can utilize the electrical transmission line by connecting one end of a cable 29 to the electrical port 24 of the data adapter unit 2 and the other end of the cable to the computer 27, e.g., to a standard serial port as known in computers. An alternative arrangement is to use an optical cable to communicate the IR signals directly between IR port 25 and the computer 27, if the latter is equipped with a suitable IR input/output port.

The data adapter unit 2, or preferably the data card 3, further includes a detector means 28 for automatically detecting whether there is a connection to the electrical port 24. Normally, signal transmission will be over line 30 between connection control unit 14 and IrComm unit 17 to produce IR signal communication. However, if the detector means 28 senses a cable connection in port 24, a signal is sent over line 31 to connection control unit 14, which cuts off transmission to IrCOMM unit 17 and puts the system into electrical transmission mode by switching the signal output at bus interface 13 from line 30 to line 26. When the cable connection is removed, the system will be switched back into optical (infrared) transmission mode. Rather than an automatic detector for means 28, a three state switch with settings of IR, OFF, and ELECTRIC, that are operable by a user, may be utilized. The user may select the settings to respectively control the data adapter unit either to output an IR signal to the IR port 25, or output nothing in the OFF condition, or output an electrical signal to the electrical output port 24. The switch 28 may produce a signal that actuates the connection control block 14 to switch the output paths, or it may just set a path to pass the data signals to one of the ports.

Alternatively, receptacle means 6, rather than accepting the phone 1 therein, may constitute an input/output port for removably coupling the data signals wirelessly or by cable to the transmission line 11. It should be noted that the thick transmission or communication lines between components represent those carrying parallel data, and the thin ones represent those carrying serial data.

It will therefore be seen that a data adapter arrangement is described which provides versatility and adaptability in conducting data communications between electronic devices and particularly facilitates wireless IR communication between such electronic devices as cellular phones and computers by appropriately converting the form of the data signals using data cards and a simple adapter containing an independent power supply. The adapter accepts data cards and couples the data signals exchanged between the electronic devices to a data card therein for converting the signals to a proper form for transmission and processing.

While the present invention has been described in terms of specific embodiments and combinations, it will be appreciated that the invention is not limited to the particular examples presented herein, and that the scope of the protection is defined in the attached claims.

What is claimed is:

1. A data adapter apparatus for converting data signals transmitted between electronic devices to a suitable form for processing within the devices, comprising:

first receptacle means in said apparatus for releasably accommodating a data signal source;

exchanger means in said apparatus for exchanging data signals with said data signal source when connected thereto;

converter means in said apparatus for converting said data signals to a form for wireless communication with an external electronic device;

second receptacle means in said apparatus for accommodating a data converter and electrically coupling said data converter between said exchanger means and said converter means for converting said data signals passing therebetween;

an electrical input/output port in said apparatus and coupled to said second receptacle means;

a wireless communication input/output port in said apparatus and coupled to said converter means; and switching means in said apparatus for switching the coupling of data signals with said data converter between said electrical input/output port and said converter means, whereby said data signals may be respectively output from said apparatus as either electrical signals or wireless communication signals.

2. Apparatus as in claim 1 wherein said converter means comprises an IR-electrical converter.

3. Apparatus as in claim 1 wherein said data signal source comprises a cellular phone.

4. Apparatus as in claim 1 wherein said second receptacle means comprises means for releasably receiving said data converter and said data converter comprises a data card.

5. Apparatus as in claim 4 wherein said data card comprises signal coding means for coding said data signals for transmission by said converter means.

6. Apparatus as in claim 1 further comprising signal coding means, coupled between said data converter and said converter means, for coding said data signals for transmission by said converter means.

7. Apparatus as in claim 1 wherein said second receptacle means comprises means for fixing said data converter therein.

8. Apparatus as in claim 1 further comprising a power source in said apparatus for powering at least said converter means.

9. Apparatus as in claim 1 wherein said switching means comprises means for detecting a cable connection in said electrical input/output port.

10. A method for converting data signals transmitted wirelessly between a data signal source and an electronic device to a suitable form for processing within the source and device, comprising the steps of:

providing a converter unit;

exchanging data signals with a data signal source by releasably connecting said unit to said source;

providing a data card in said unit and electrically coupling said data card to said source;

converting said data signals using said data card to a form either for direct electrical connection to or for wireless communication with an external electronic device;

coupling an electrical input/output port in said unit to said data card;

coupling a wireless communication input/output port in said unit to said data card; and selectively switching the coupling of converted data signals with said data card between said electrical input/output port and said wireless communication input/output port, such that data signals in direct electrical connection form are coupled to said electrical input/output port and data signals in wireless communication form are coupled to said wireless communication input/output port, whereby said data signals may be respectively output from said unit as either electrical signals or wireless communication signals.

11. A method as in claim 10 wherein said wireless communication is with IR signals.

12. A method as in claim 10 wherein said data card comprises a PCMCIA card.

13. A method as in claim 10 wherein said data signal source comprises a cellular phone.

14. A method as in claim 10 comprising the further step of providing a power source in said unit for powering the converting of said data signals.

15. A method as in claim 10 comprising the further step of coding said data signals preparatory to said converting step.

16. A method as in claim 10 wherein said selectively switching step comprises detecting whether there is an electrical connector in said electrical input/output port and producing an indicative signal in response thereto to switch the coupling of data signals with said data card to said electrical input/output port.

17. A method as in claim 10 wherein said data card is releasably accepted in said unit.

18. A data adapter apparatus for converting data signals for wireless IR communication between a cellular phone and an electronic device, comprising:

first receptacle means in said apparatus for releasably accepting a cellular phone and exchanging data signals therewith;

an IR-electrical converter means in said apparatus for converting said data signals to a form for IR wireless communication with an external electronic device;

second receptacle means in said apparatus for releasably accepting a data card and electrically coupling said data card between said first receptacle means and said IR-electrical converter means, said data card processing said data signals therebetween to convert said data signals for use in said cellular phone and said electronic device;

an electrical input/output port in said apparatus coupled to said second receptacle means;

a wireless IR communication input/output port in said apparatus coupled to said IR-electrical converter means; and means in said apparatus for switching the coupling of converted data signals with said second receptacle means between said electrical input/output port and said IR-electrical converter means.

19. Apparatus as in claim 18 further comprising a power source in said apparatus for powering at least said IR-electrical converter means.

20. Apparatus as in claim 18 further comprising signal coding means in said apparatus, coupled between said data card in said second receptacle means and said IR-electrical converter means, for coding said data signals for transmission by said IR-electrical converter means.

21. Apparatus as in claim 18 wherein said data card comprises a PCMCIA card.

* * * * *